(12) United States Patent
Kim et al.

(10) Patent No.: US 8,622,024 B2
(45) Date of Patent: Jan. 7, 2014

(54) SEA CUCUMBER CULTIVATOR

(76) Inventors: Hak Lim Kim, Jeju-si (KR); Soo Chul Kim, Jeju-si (KR); Byung Yeob Kim, Jeju-si (KR)

(*) Notice: Subject to any disclaimer, the term of this patent is extended or adjusted under 35 U.S.C. 154(b) by 0 days.

(21) Appl. No.: 13/342,333

(22) Filed: Jan. 3, 2012

(65) Prior Publication Data

US 2012/0097112 A1    Apr. 26, 2012

Related U.S. Application Data

(63) Continuation of application No. PCT/KR2010/004906, filed on Jul. 27, 2010.

(30) Foreign Application Priority Data

Jul. 27, 2009 (KR) .................. 10-2009-0068518
May 27, 2010 (KR) .................. 10-2010-0049646

(51) Int. Cl.
*A01K 61/00* (2006.01)

(52) U.S. Cl.
USPC .................................. 119/200; 119/240

(58) Field of Classification Search
USPC .......... 119/234, 236, 238, 239, 240, 214, 200
See application file for complete search history.

(56) References Cited

U.S. PATENT DOCUMENTS

| | | | |
|---|---|---|---|
| 2,302,336 A * | 11/1942 | MacDonald | 119/214 |
| 3,707,948 A * | 1/1973 | Dunathan | 119/236 |
| 3,766,888 A * | 10/1973 | Wiegardt, Jr. | 119/240 |
| 4,003,338 A * | 1/1977 | Neff et al. | 119/223 |
| 4,089,298 A * | 5/1978 | Wilson | 119/201 |
| 4,594,965 A * | 6/1986 | Asher et al. | 119/239 |
| 5,377,624 A * | 1/1995 | Craig et al. | 119/234 |
| 5,769,027 A * | 6/1998 | Adams et al. | 119/238 |
| 6,044,798 A * | 4/2000 | Foster et al. | 119/240 |
| 6,223,689 B1 * | 5/2001 | Nelson | 119/234 |

FOREIGN PATENT DOCUMENTS

| | | | | |
|---|---|---|---|---|
| JP | 61274718 A | * | 12/1986 | ............ B01D 35/02 |
| KR | 10-2002-0024060 A | | 3/2002 | |
| KR | 10-0769122 B1 | | 10/2007 | |

* cited by examiner

*Primary Examiner* — Son T Nguyen
(74) *Attorney, Agent, or Firm* — Park & Associates IP Law, P.C.

(57) ABSTRACT

In a sea cucumber cultivator, sea cucumber cultivation baskets are arranged in multiple layers within a housing to protect the sea cucumbers from the external environment, to enable mass production and easy management of sea cucumbers. An inlet pipe and an outlet pipe are arranged to adjust the inflow and outflow of seawater to and from the housing. Each hose outlet is formed at a center region of a lower surface of a bottom of each sea cucumber cultivation basket in each layer so as to supply food for sea cucumbers to the cultivating spaces formed in the cucumber cultivation baskets arranged in multiple layers. Thus, food is discharged through the hose outlets and settles in the baskets to feed sea cucumbers and to enable sea cucumbers to easily intake food.

17 Claims, 18 Drawing Sheets

SEA CUCUMBER CULTIVATOR

REFERENCE TO RELATED APPLICATIONS

This is a continuation of pending International Patent Application PCT/KR2010/004906 filed on Jul. 27, 2010, which designates the United States and claims priority of Korean Application No. 10-2009-0068518 filed on Jul. 27, 2009 and Korean Application No. 10-2010-0049646 filed on May 27, 2010, the entire contents of which are incorporated herein by reference.

FIELD OF THE INVENTION

The present invention relates to a sea cucumber cultivator in which sea cucumber cultivation baskets are densely arranged in multiple layers to enable mass production of sea cucumbers, and in which the cultivation environment such as the supply of oxygen, feeding, etc., is optimized to achieve maximal cultivation efficiency. More particularly, the present invention relates to a sea cucumber cultivator in which sea cucumber cultivation baskets are arranged in multiple layers within a housing for protecting sea cucumbers from the external environment, to enable mass production and easy management of sea cucumbers, in which seawater inlet and outlet pipes are configured to adjust the inflow and outflow of seawater to and from the housing, and in which air supply pipes for supplying air containing oxygen are configured to inject air into the housing, so that the cultivation environments may be optimized, resulting in improved quality and harvest rate of sea cucumbers.

BACKGROUND OF THE INVENTION

Aquaculture refers to practice of producing seeds of aquatic animals or plants and growing or cultivating the produced seeds in a given water area in order to use adult animals or plants for food or for other purposes. Sea cucumber cultivation may include seed scattering type cultivation of scattering sea cucumber seeds over a suitable cultivation area, embankment type cultivation, hanging type cultivation, land-based aquatic plant type cultivation, etc.

In seed scattering type cultivation, sea cucumber seeds are scattered and grown over a sea area abounding in seaweeds and adult sea cucumbers are picked or harvested by divers. In hanging type cultivation, infant sea cucumbers are accommodated and artificially fed within wicker baskets or cylindrical baskets which are suspended in the sea. In embankment type cultivation, banks are formed using stones so that seawater flows freely through gaps between the stones to maintain good water quality, and infant sea cucumbers within the banks are fed with artificial or natural foods. In the land-based aquatic plant type cultivation, using pieces of polycarbonate plates and/or mesh type sacks, infant sea cucumbers are cultivated together with abalones therein.

FIG. 1 is a perspective view of an aquatic plant for cultivation of sea cucumbers employed in conventional land-based circulation aquatic plant type cultivation.

Referring to FIG. 1, a land-based circulation aquatic plant 1 has an exposed top face with a rectangular partitioned form using a concrete material. The plant 1 includes a seawater supply device for supplying the seawater from the sea to the plant. A plurality of strings is disposed across the exposed top face and a plurality of mesh type sacks are hung from the strings so as to be in contact with a bottom of the plant. In some cases, sea cucumbers are cultivated together with abalones.

FIG. 2 is a perspective view of a fish cultivation aquatic plant used in conventional land-based aquatic plant type cultivation.

Referring to FIG. 2, a conventional fish cultivation aquatic plant 2 has an exposed top face with a circular or square shape. The plant 2 includes a discharge pipe through which seawater containing excreta of fish, food residues and/or containments such as organic or inorganic materials is discharged to the coastal area. Such land-based aquatic plant cultivation has become commonplace.

A sea cucumber belonging to echinodermata can not swim unlike fish but crawls on the surface, and is a nocturnal animal. Therefore, sea cucumbers crawl in an attached manner onto bottom and side surfaces of the conventional sea cucumber or fish cultivation plant. However, since the bottom and side surfaces of the conventional sea cucumber or fish cultivation plant are made of hard concrete or FRP (Fiber Reinforced Plastic), dissolved oxygen may not be supplied to sea cucumbers through the bottom and side surfaces thereof. Although oxygen may be artificially supplied into the plant, the oxygen may not reach sea cucumbers well due to fast floating of oxygen in water.

Moreover, a seawater discharge hole is located at a center of the cultivation plant and thus seawater is discharged at lower or high flow rates. Therefore, sea cucumbers seeds and food may be lost. Otherwise, food settled on the bottom becomes corrupted as time goes by, generating harmful gases. Such harmful gases may suffocate sea cucumbers or the corrupted food may come into contact with the skins of sea cucumbers, thus killing the sea cucumbers. Since sea cucumbers are nocturnal animals and light is not screened from the exposed top face, resulting in a small dark space, a living area of sea cucumbers is small and a population density of the cultivated sea cucumbers is low and sea cucumbers are not raised with good health due to the narrow movement area. In addition to these problems, sea pollution may increase due to the corrupted food residues and weights of sea cucumbers may reduce especially within hot seawater in midsummer.

As for the seed scattering type cultivation, sea cucumbers seeds are scattered randomly over a given sea farm and are naturally raised for a certain period until adult sea cucumbers are to be picked or harvested for sale. Therefore, seed scattering type cultivation may be cost-efficient in terms of cultivation but may be labor-intensive in terms of harvesting. In seed scattering type cultivation, not only is it difficult to harvest the scattered sea cucumbers but also survival and collection rates of sea cucumbers may be low because of harmful organisms.

As for hanging type cultivation using wicker baskets or cylindrical baskets, there may occur the following problems: loss of a cultivator due to unique physical nature of the sea, that is, high waves for example from typhoons; death of sea cucumbers due to red tides; weight reduction of sea cucumbers due to high temperature seawater or irregular feeding; increasing effect of stress on sea cucumbers resulting from movement of a cultivator in feeding; and low population density of the cultivated sea cucumber due to a small area of the cultivator.

As for embankment type cultivation, there may occur the following problems: weight reduction of sea cucumbers due to high temperature seawater in the summer or frozen seawater in the winter; increase of sea pollution due to food residues; increase of food price for sea cucumbers; and harmful effects on other sea farms due to interruption of seawater flow.

SUMMARY OF THE INVENTION

An object of the invention is to provide a sea cucumber cultivator which optimizes cultivation environments for sea cucumbers so as to improve quality and harvest or collection rate of sea cucumbers and hence overcomes all of the drawbacks of the variety of the above mentioned sea cucumber cultivation approaches. This object may be achieved as follows. In the sea cucumber cultivator, sea cucumber cultivation baskets are arranged in multiple layers within a housing for protecting cultivated sea cucumbers from the external environment, to enable mass production and easy management of sea cucumbers. Seawater inlet and outlet pipes are installed to adjust the inflow and outflow of seawater to and from the housing. The seawater inlet and outlet pipes are formed of upper, lower, left and right communication pipes, resulting in smooth inflow and outflow of the seawater into/from the cultivation baskets in the housing. Opening/closing operations of respective valves are controlled such that each of all of the upper, lower, left and right communication pipes may selectively function as the seawater inlet pipe or outlet pipe. Therefore, the communication pipes may be prevented from being clogged with foreign substances by controlling the valves. Air supply pipes for supplying air containing oxygen into the cultivation baskets arranged in a plurality of layers are configured to penetrate the housing for injecting air into the housing. A food supply unit is configured so as to supply food into the cultivation baskets arranged in a plurality of layers.

The object of the present invention can be achieved by providing the following sea cucumber cultivators.

A sea cucumber cultivator according to an embodiment of the invention may include a housing having a hollow accommodation space therein, the housing being coupled with inlet and outlet pipes for seawater inflow and outflow, and formed, at side and top portions thereof, with a door unit and an auxiliary door unit for opening/closing the housing; a plurality of cultivation baskets supported in a suspended state in the housing, each of the baskets having a cultivation space to cultivate sea cucumbers; and an air supply unit installed outside the housing to supply air containing oxygen into the housing, the air supply unit including an air inlet pipe penetrating the housing from an outside thereof to an inside thereof and partially protruding toward the inside of the housing.

The door unit may be coupled to either or both sides of the housing so as to open/close the housing. A central portion of the door unit may be made of a transparent material so that the inside of the housing is visible.

The auxiliary door unit may include at least one auxiliary door unit installed at the top portion of the housing. The auxiliary door unit may be fixed, at one side thereof, to the housing to open/close the housing using a hinge. A plurality of perforations may be formed in a body of the auxiliary door unit so that air or seawater in the housing is discharged to the outside of the housing. A seawater guide pipe may be formed at the outside of the body so as to guide seawater discharged through the perforations into the body.

A plurality of perforations may be formed at each of the cultivation baskets so that air flows upwardly through the cultivation basket. A plurality of rollers may be installed at a lower surface of a top portion of each cultivation basket at both sides of the cultivation basket so that the cultivation basket is slidably supported by rails having a shape corresponding to the lower surface among rails formed at an inner wall surface of the housing, via the rollers.

A plurality of perforations may be formed at each of the cultivation baskets so that air flows upwardly through the cultivation basket. A plurality of rollers may be installed at a lower surface of a top portion of each cultivation basket at both sides of the cultivation basket so that the cultivation basket is slidably supported by rails having a shape corresponding to the lower surface among rails formed at one side of a frame installed in the housing, via the rollers. The rails formed at the inner wall surface of the housing or at one side of the frame may include a plurality of vertically-spaced rails arranged along the inner wall surface to support the cultivation baskets in a stacked manner.

The frame may be fixed to the housing at upper and lower portions of the inner wall face of the housing, and the frame may include a pair of frames installed at right and left sides of the housing respectively. A plurality of vertically-spaced steps extending toward a center of the housing may be formed at one side of each of the left and right frames, to form the plurality of rails. A plurality of vertically-spaced holders may be installed at the other side of each of the left and right frames, to support a plurality of side plates, each of which is horizontally installed between the inner wall face of the housing and the frame corresponding to the holders.

The cultivation baskets may further include connection plates to connect neighboring cultivation baskets among a plurality of the cultivation baskets disposed in a horizontally spaced manner at regular intervals and disposed on one rail so that sea cucumbers move between the neighboring cultivation baskets. The cultivation baskets may further include tilted plates connecting one cultivation basket among a plurality of the cultivation baskets disposed in a vertically spaced manner at regular intervals and another cultivation basket immediately under a cultivation basket horizontally neighboring the former cultivation basket so that sea cucumbers move between the former and latter cultivation baskets.

A plurality of bottom plates coupled to each other may be disposed at a bottom of the housing so as to prevent sea cucumbers seated within the cultivation basket from entering into the outlet pipe. Each locker may be formed at a lower surface of the bottom plate while having a central groove for fastening the bottom plate to the bottom of the housing. An engaging member may be formed on an inner face of a bottom of the housing while having a shape corresponding to that of the central groove of the locker. The locker may be attached to or detached from the engaging member. The cultivator may further include a water storage tank disposed outside the housing so as to communicate with the inlet and outlet pipes and store the seawater. A temperature adjustment unit may be installed at the water storage tank for adjusting a seawater temperature.

The inlet and outlet pipes may include an upper communication pipe, lower communication pipe, left communication pipe and right communication pipe communicating with the upper, lower, left and right sides of the housing respectively for inflow or outflow of the seawater. The upper, lower, left and right communication pipes may or may not communicate with, via opening/closing of respective valves, a main inlet pipe for transferring the seawater from the water storage tank to the housing. The respective valves may be controlled such that one or more communication pipes among the upper, lower, left and right communication pipes injects seawater into the housing using opening/closing operation of the valves while one or more other communication pipes among the upper, lower, left and right communication pipes discharges the seawater from the housing through opening/closing operation of the valves.

The cultivator may further include a food supply unit installed at the outside of the housing to supply food into the cultivation baskets in the housing. The food supply unit may include a ringer tank having a given accommodation space for storing food for sea cucumbers, a food injection hole for injecting the food and a compressed air injection hole for injecting compressed air; a multifold unit being installed under the ringer tank so as to communicate with the ringer tank and having a plurality of branched pipes; ringer hoses being coupled in a communication manner to discharge ends of the branched pipes and penetrating the auxiliary door unit of the housing and being held at the bottom of the cultivation baskets for supplying the food in the ringer tank into the cultivation baskets; and hose outlets formed at ends of the ringer hoses for discharging the food. As for the plurality of branched pipes, the food injection hole, and the compressed air injection hole, whether or not and/or how much food or air is injected may be controlled depending on opening/closing operations of the valves.

The cultivator may further include a support unit provided at both ends of the housing so that the housing is seated thereon. The support unit may include an upper support part and lower support part which are assembled together. Recesses may be formed respectively at facing surfaces of the upper and lower support parts of the support unit while having a shape corresponding to that of an outer wall of the housing to surround the outer wall of the housing. A plurality of the support units may be stacked so that a plurality of the housings is densely arranged.

The air supply unit may include an air inlet pipe having a plurality of branched pipe portions which penetrate the housing and have ends protruding into the housing for inflow of air into the housing; an air storage tank for injecting air into the air inlet pipe; and an evaporator disposed between the air inlet pipe and air storage tank to evaporate the injected air from the air storage tank. The air supply unit may further include an oxygen supply unit for supplying oxygen into the housing.

According to the embodiments of the invention, sea cucumbers may be securely raised in the housing and the seawater temperature may be adjusted to a regular and suitable level. Thus, sea cucumbers may be securely protected from fluctuation in sea conditions, thereby improving survival and harvest rates of sea cucumbers. Moreover, sea cucumbers may be fed on a regular basis and the population density of sea cucumbers may be greatly increased, resulting in mass production of sea cucumbers.

With the temperature adjustment unit installed at the water storage tank, a suitable seawater temperature for cultivating sea cucumbers may be maintained, to shorten time to harvest of sea cucumbers. Further, a large amount of oxygen may be supplied using the air supply unit and dissolved oxygen may be supplied to all of the sea cucumbers seated in the housing through the perforations of the cultivation baskets, thus producing healthy sea cucumbers. The housing may, in nature, screen a substantial amount of light except for a minimum necessary amount of light, to achieve a suitable growth environment according to the nocturnal nature of sea cucumbers.

According to the embodiments of the invention, the air inlet pipes may be formed at the bottom of the housing and the injection nozzles may be installed at the ends of the air inlet pipes to inject the compressed air periodically and thus form whirlpools from below. Using the formed whirlpools, the supplied food and seawater may be uniformly distributed within the housing in accordance with the physical nature of the sea. Thus, not only may the food be supplied to the cultivation baskets arranged in a stacked way, the connection plates and tilted plates, but also the settled food and sea cucumber excreta on the bottoms of the baskets may be floated or decomposed to be guided into the seawater discharge holes using the injected air containing oxygen. As a result, a large amount of the food and oxygen may be uniformly distributed and a clean and optimal cultivation environment may be obtained.

Some forms of the support units may be provided so as to increase the population density and moving distance of sea cucumbers. Moreover, some forms of the support units may be recycled, when used in a combined manner with an existing land-based facility for fish cultivation, the seawater polluted with, for example, fish excreta, excess food, organic substances discharged from land-based aquatic plants for fish cultivation, thereby purifying the seawater and thus protecting coastal waters from pollution. Further, using some forms of the support units, the fish may be cultivated out of the housing and sea cucumbers may be cultivated within the housing, leading to a hybrid type cultivation in which the cultivation space may be further optimized and cultivation management may be further simplified.

The inlet and outlet pipes may be formed of the upper, lower, left and right communication pipes and the main inlet pipe communicating with the upper, lower, left and right communication pipes. The respective values are controlled such that one or more communication pipes among the upper, lower, left and right communication pipes injects the seawater into the housing using opening/closing operation of the valves while one or more other communication pipes among the upper, lower, left and right communication pipes discharges the seawater from the housing using opening/closing operation of the valves. Thus, the discharge holes of the pipes may be prevented from becoming clogged with foreign substances such as sand due to continuous inflow and outflow of the seawater.

Not only the inflow and outflow of the seawater but also the supply of the food are easily controlled and maintained from the outside of the sea cucumber cultivator. Thus, through the entire process of cultivating sea cucumbers, labor may be minimized and the working processes may be simplified.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

Below, a sea cucumber cultivator according to an embodiment of the invention will be described in detail with reference to the accompanying drawings.

Figure 1:
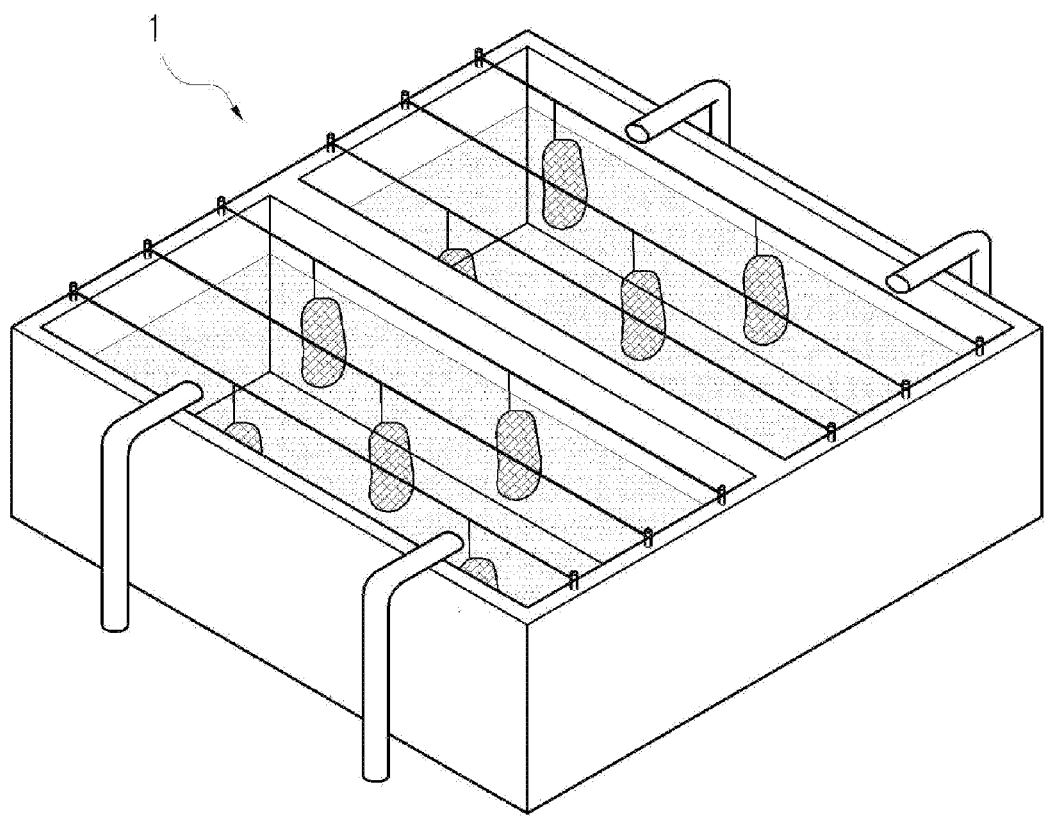
FIG. 1 is a perspective view of an aquatic plant for cultivation of sea cucumbers employed in conventional land-based circulation aquatic plant type cultivation.
Figure 2:
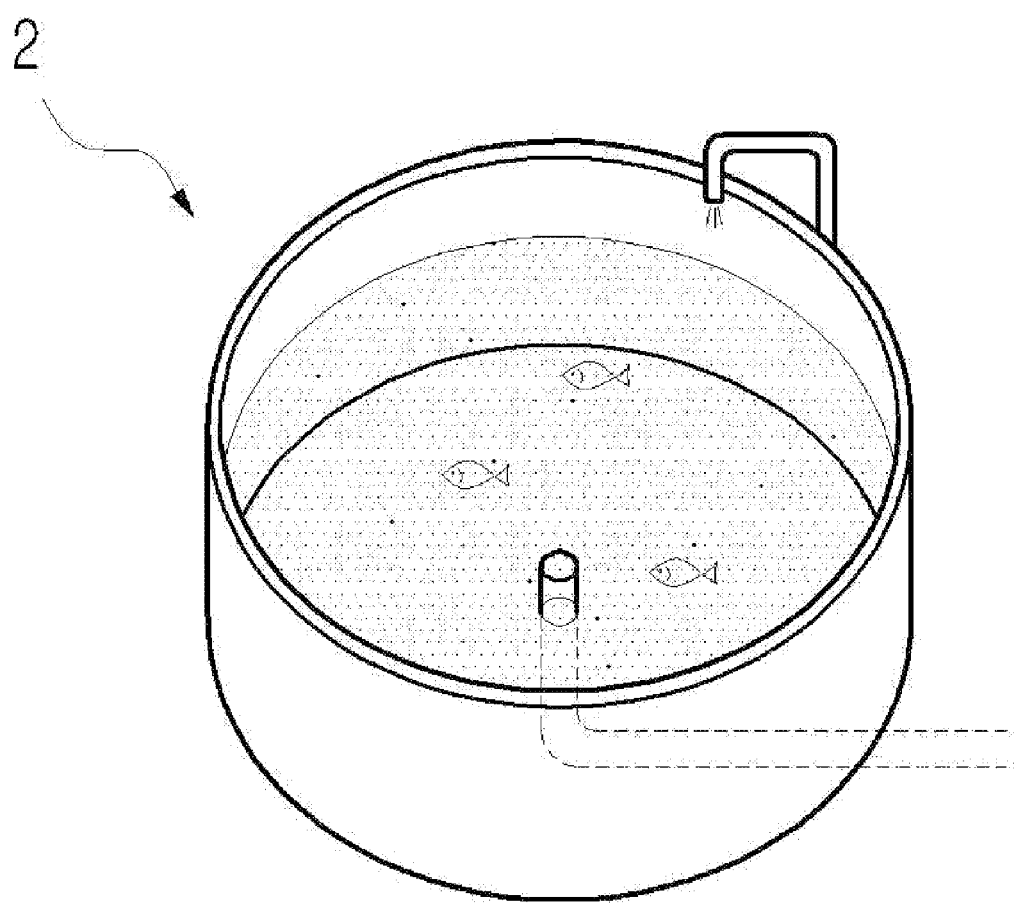
FIG. 2 is a perspective view of a fish cultivation aquatic plant used in conventional land-based aquatic plant type cultivation.
Figure 3:
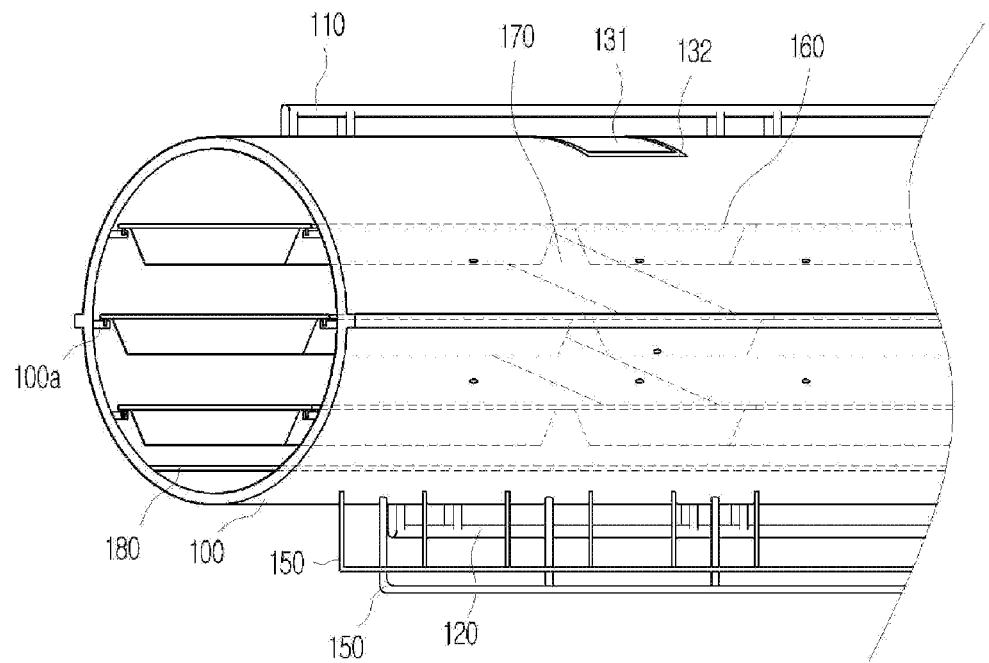
FIG. 3 is a schematic view of a sea cucumber cultivator according to an embodiment of the invention.
Figure 4:
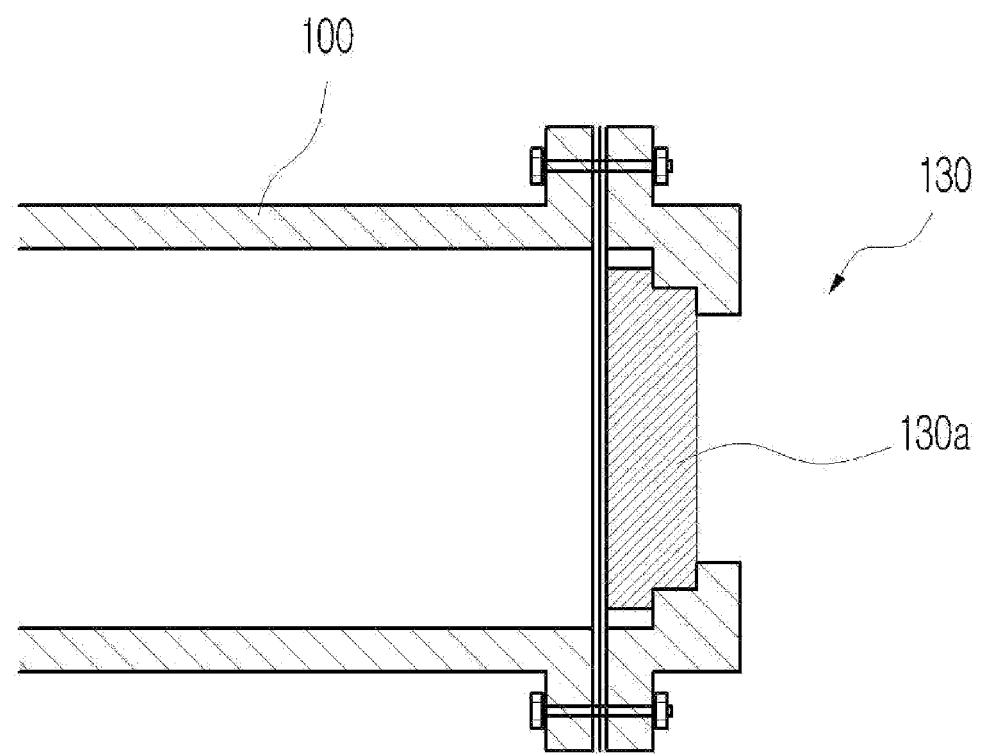
FIG. 4 illustrates a structure of a door unit of a sea cucumber cultivator according to an embodiment of the invention.
Figure 5:
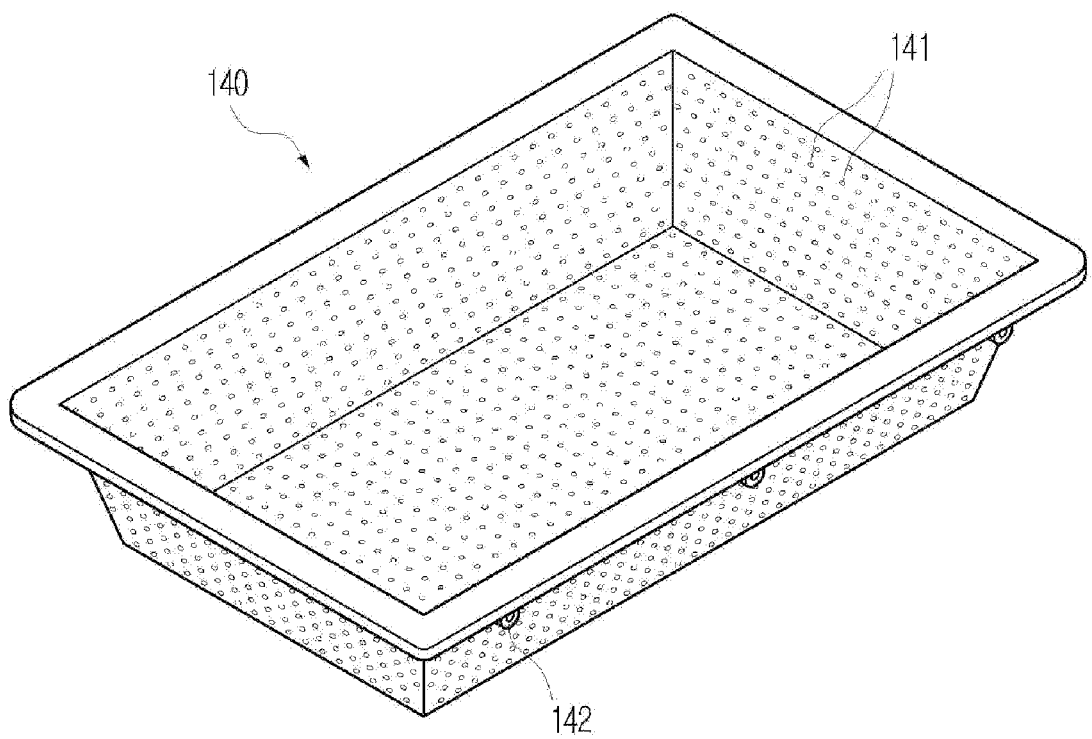
FIG. 5 is a perspective view of a cultivation basket of a sea cucumber cultivator according to an embodiment of the invention.
Figure 6:
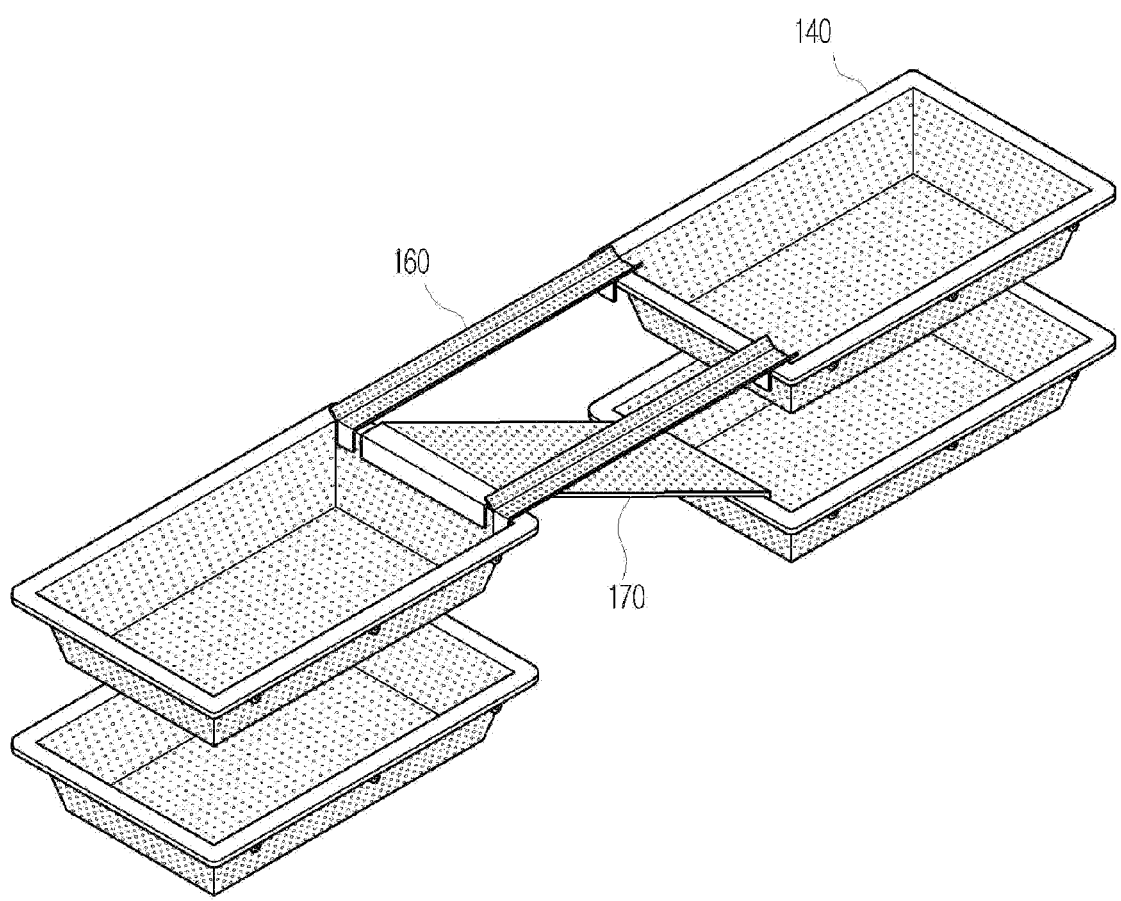
FIG. 6 is a perspective view illustrating a state in which the cultivation baskets are connected through connection plates and a tilted plate according to an embodiment of the invention.

FIG. 3 is a schematic view of a sea cucumber cultivator according to an embodiment of the invention. FIG. 4 illustrates a structure of a door unit of sea cucumber cultivator according to an embodiment of the invention. FIG. 5 is a perspective view of a cultivation basket of a sea cucumber cultivator according to an embodiment of the invention. FIG. 6 is a perspective view illustrating a state in which cultivation baskets are connected through connection plates and a tilted plate according to an embodiment of the invention.

Figure 7:
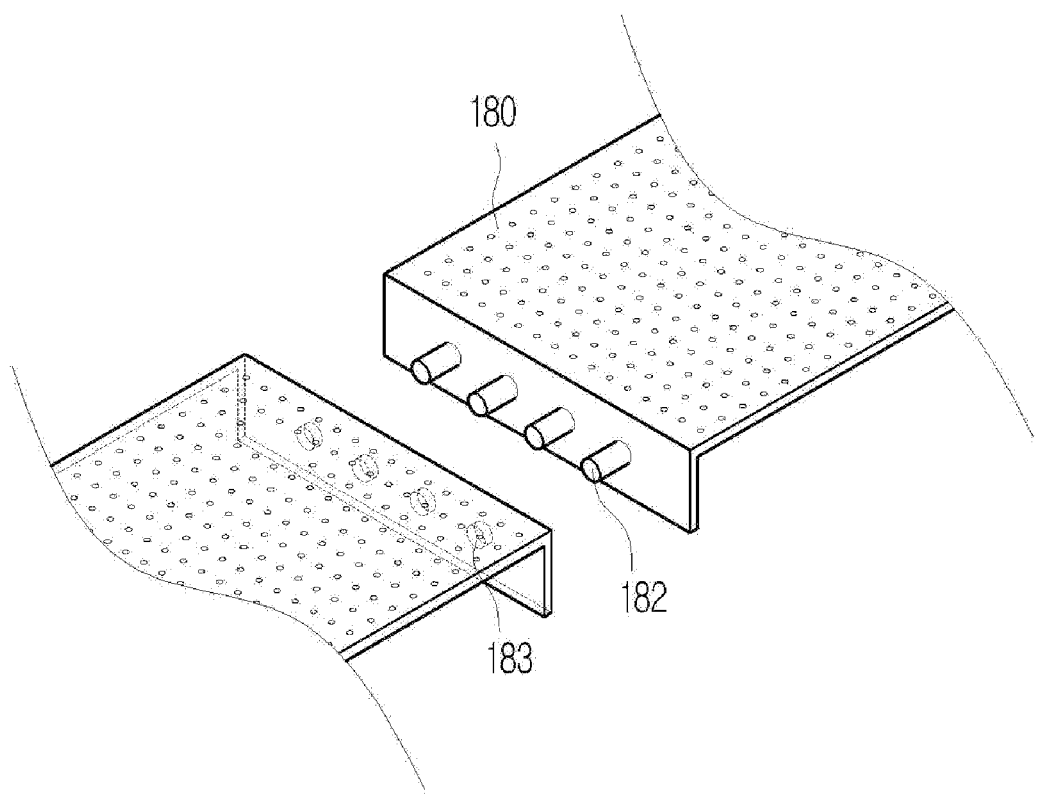
FIG. 7 and FIG. 8 are perspective views illustrating a state in which bottom plates are coupled to each other according to an embodiment of the invention.
Figure 8:
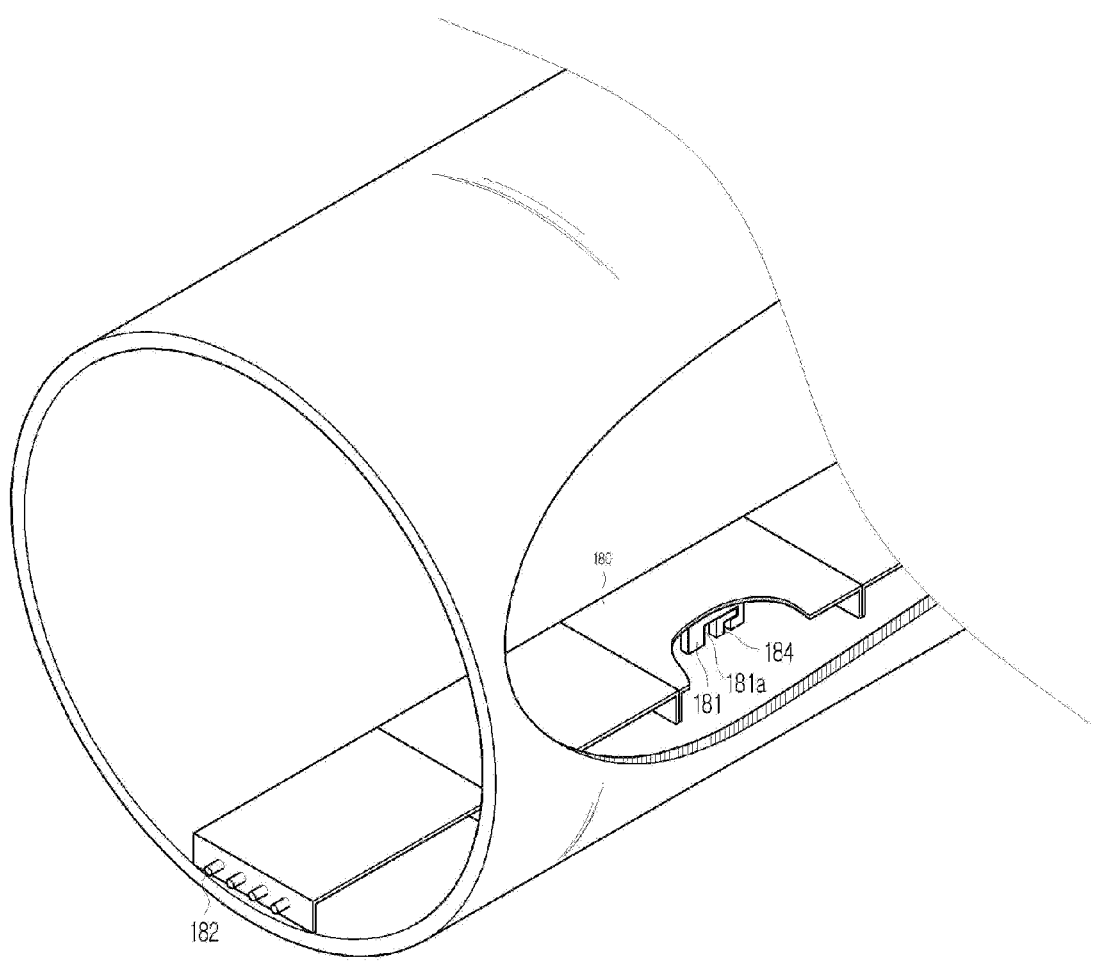
Figure 9:
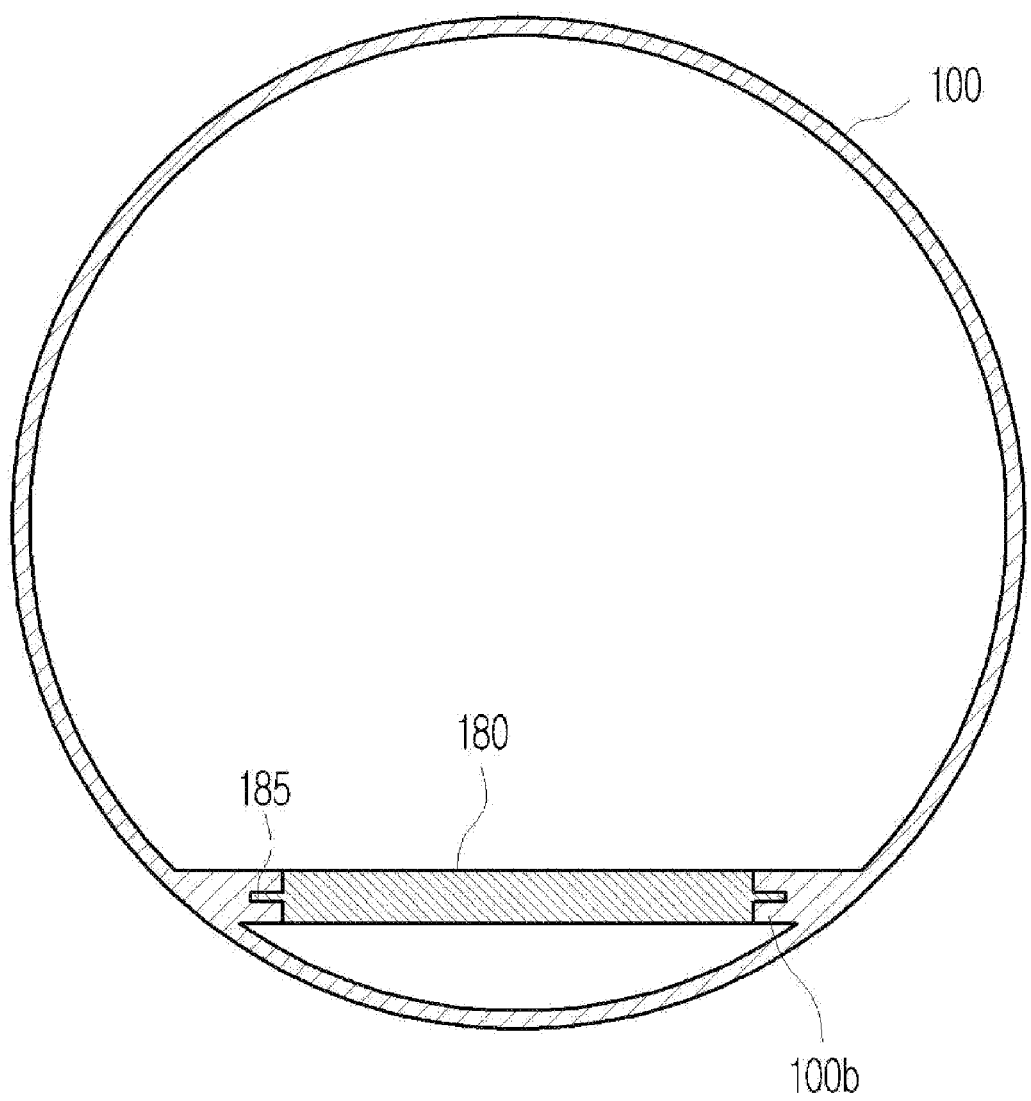
FIG. 9 shows a bottom plate according to another embodiment of the invention.
Figure 10:
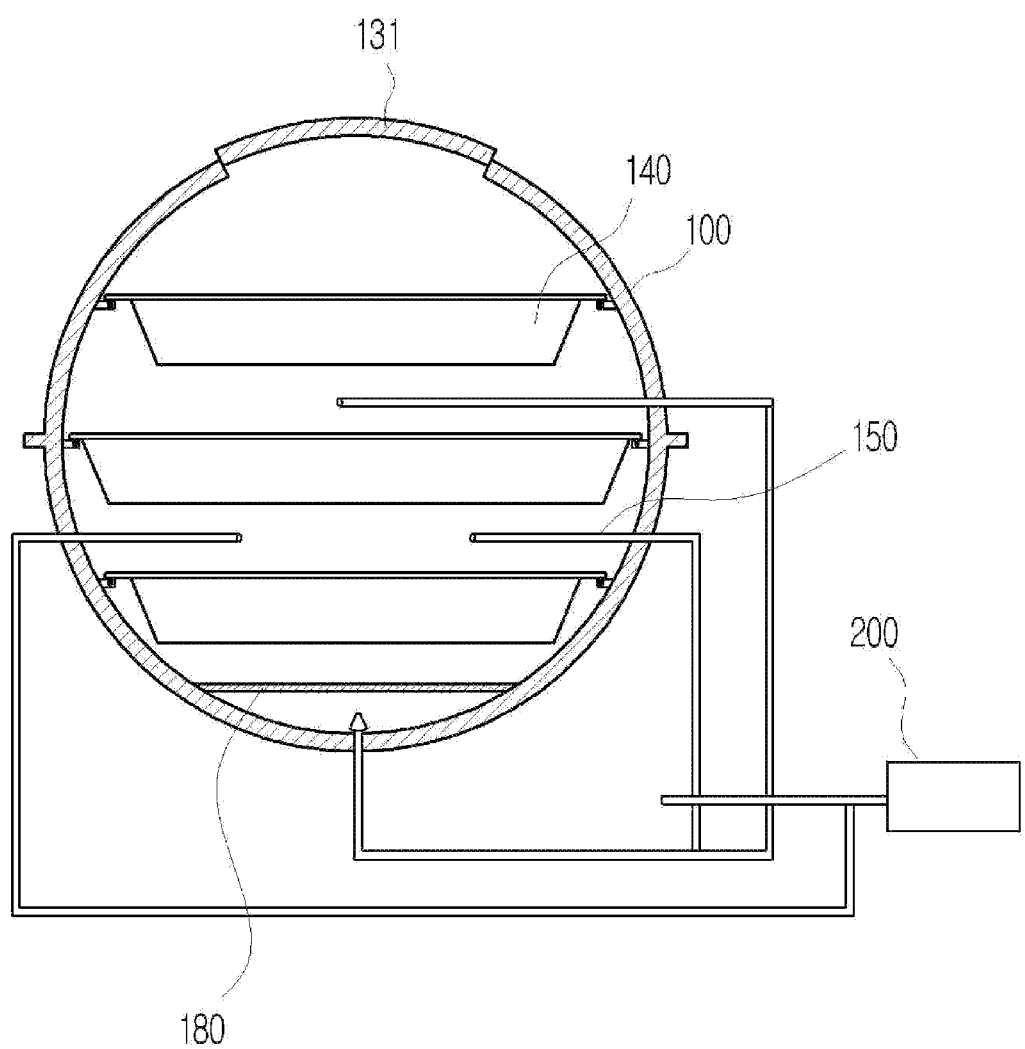
FIG. 10 is a side cross-sectional view of a housing illustrating configurations of an air supply unit and air inlet and outlet pipes according to an embodiment of the invention.
Figure 11:
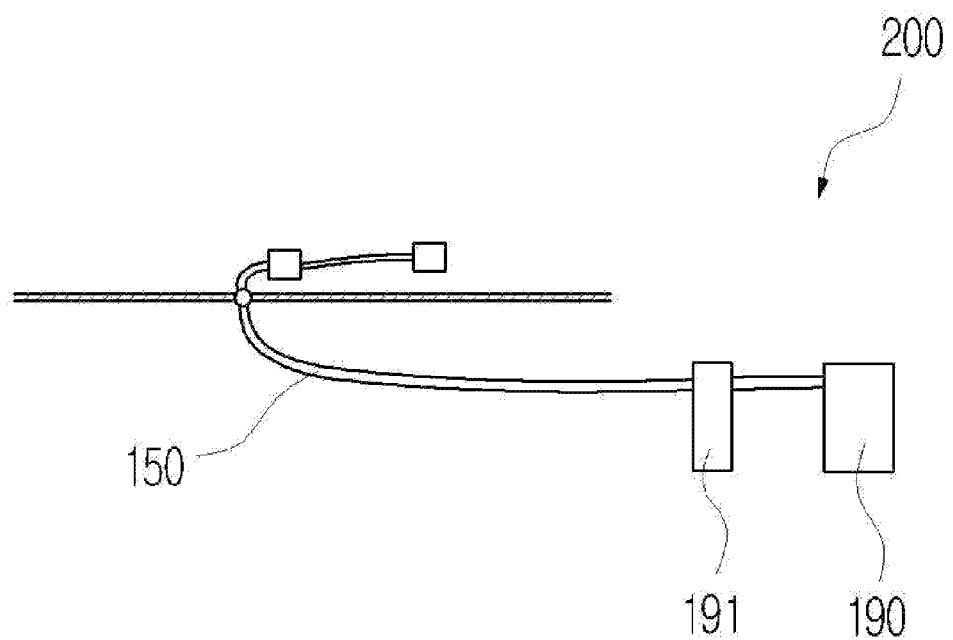
FIG. 11 is a schematic view of a configuration of the air supply unit for supplying oxygen to a lower portion of the housing according to an embodiment of the invention.
Figure 12:
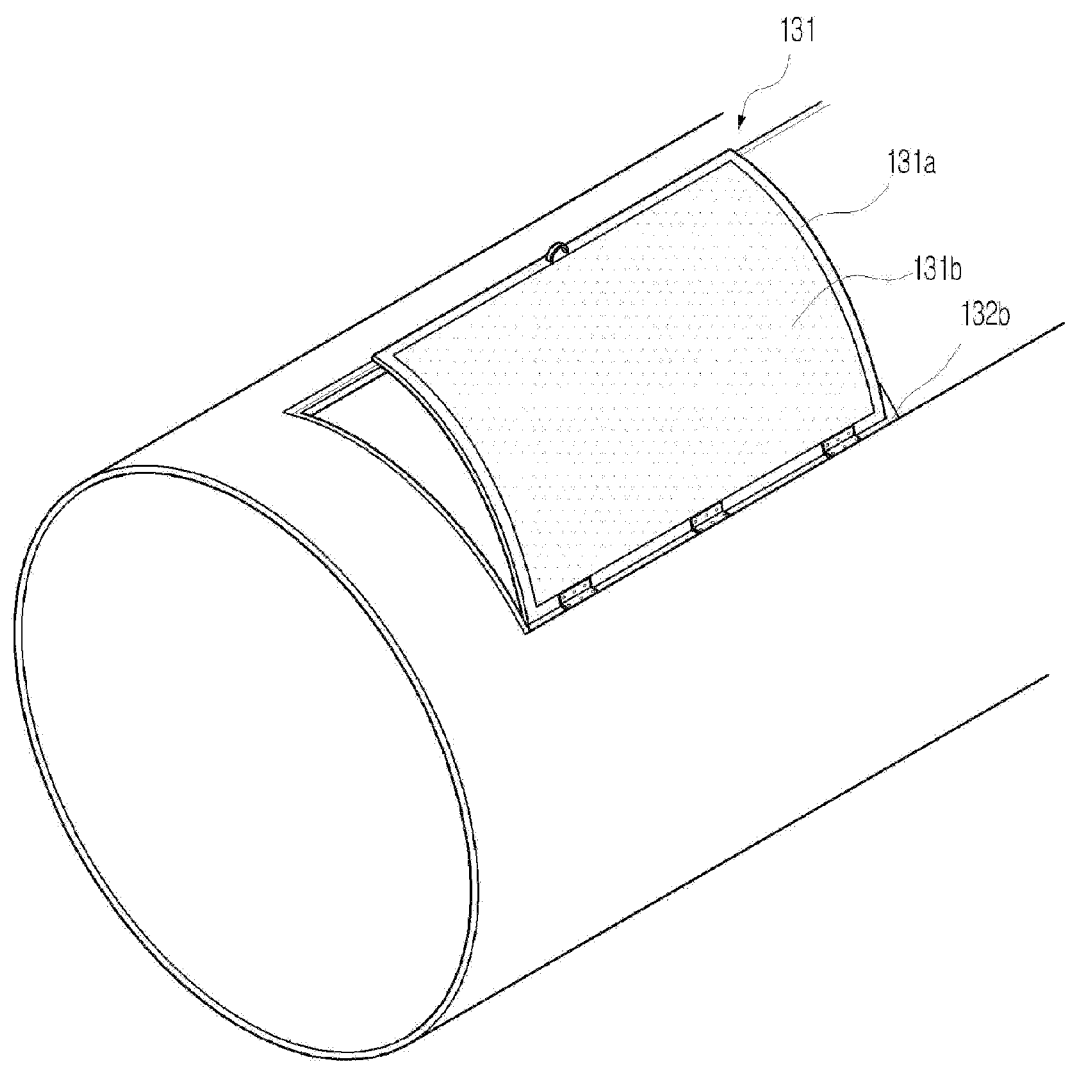
FIG. 12 is an enlarged view of an auxiliary door unit according to an embodiment of the invention.
Figure 13:
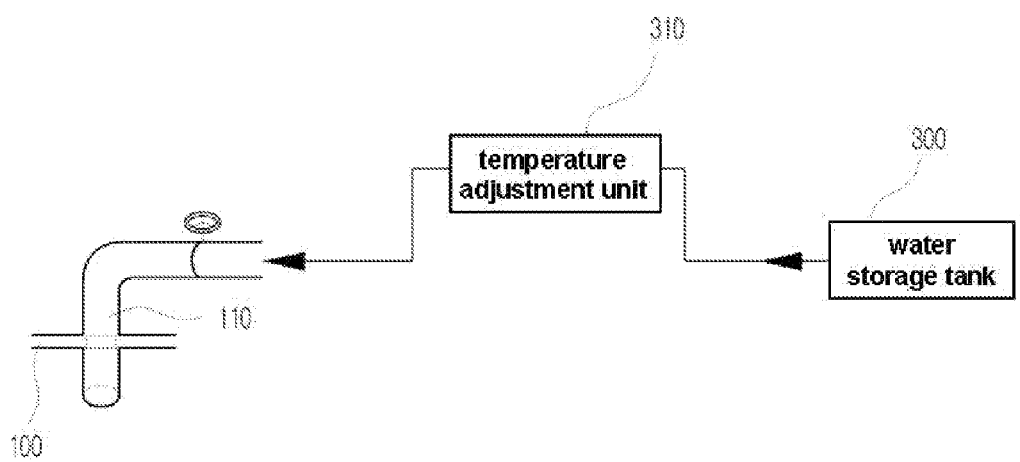
FIG. 13 illustrates a configuration of a storage tank, a temperature adjustment unit and an inlet pipe of seawater according to an embodiment of the invention.

FIG. 7 and FIG. 8 are perspective views illustrating a state in which bottom plates are coupled according to an embodiment of the invention. FIG. 9 shows a bottom plate according to another embodiment of the invention. FIG. 10 is a side cross-sectional view of a housing for illustrating structures of an air supply unit and air inlet and outlet pipes according to an embodiment of the invention. FIG. 11 is a schematic view of a configuration of the air supply unit for supplying oxygen to a lower portion of the housing according to an embodiment of the invention. FIG. 12 is an enlarged view of an auxiliary door unit according to an embodiment of the invention. FIG. 13 illustrates a configuration of a storage tank, a temperature adjustment unit and an inlet pipe of seawater according to an embodiment of the invention.

Figure 14:
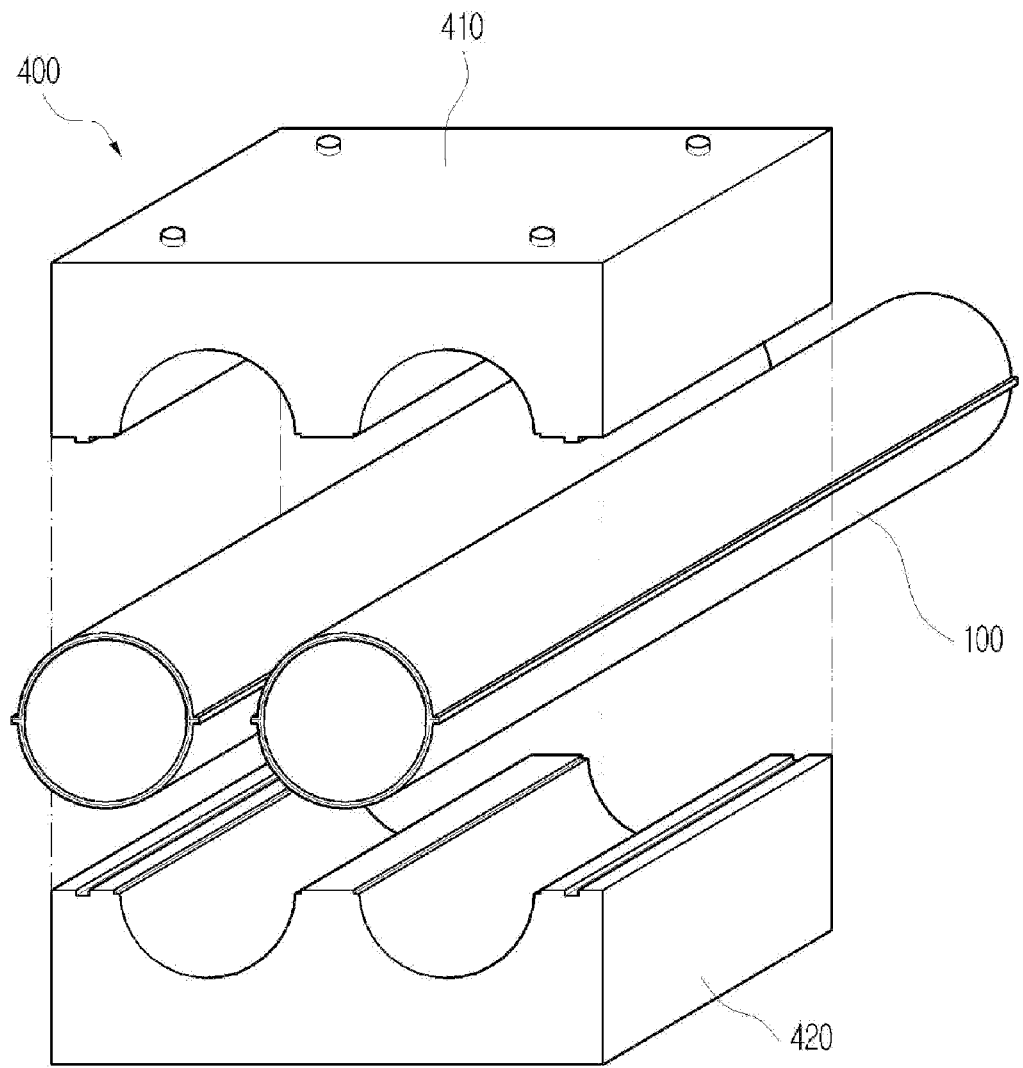
FIG. 14 illustrates a configuration of a support unit according to an embodiment of the invention.
Figure 15:
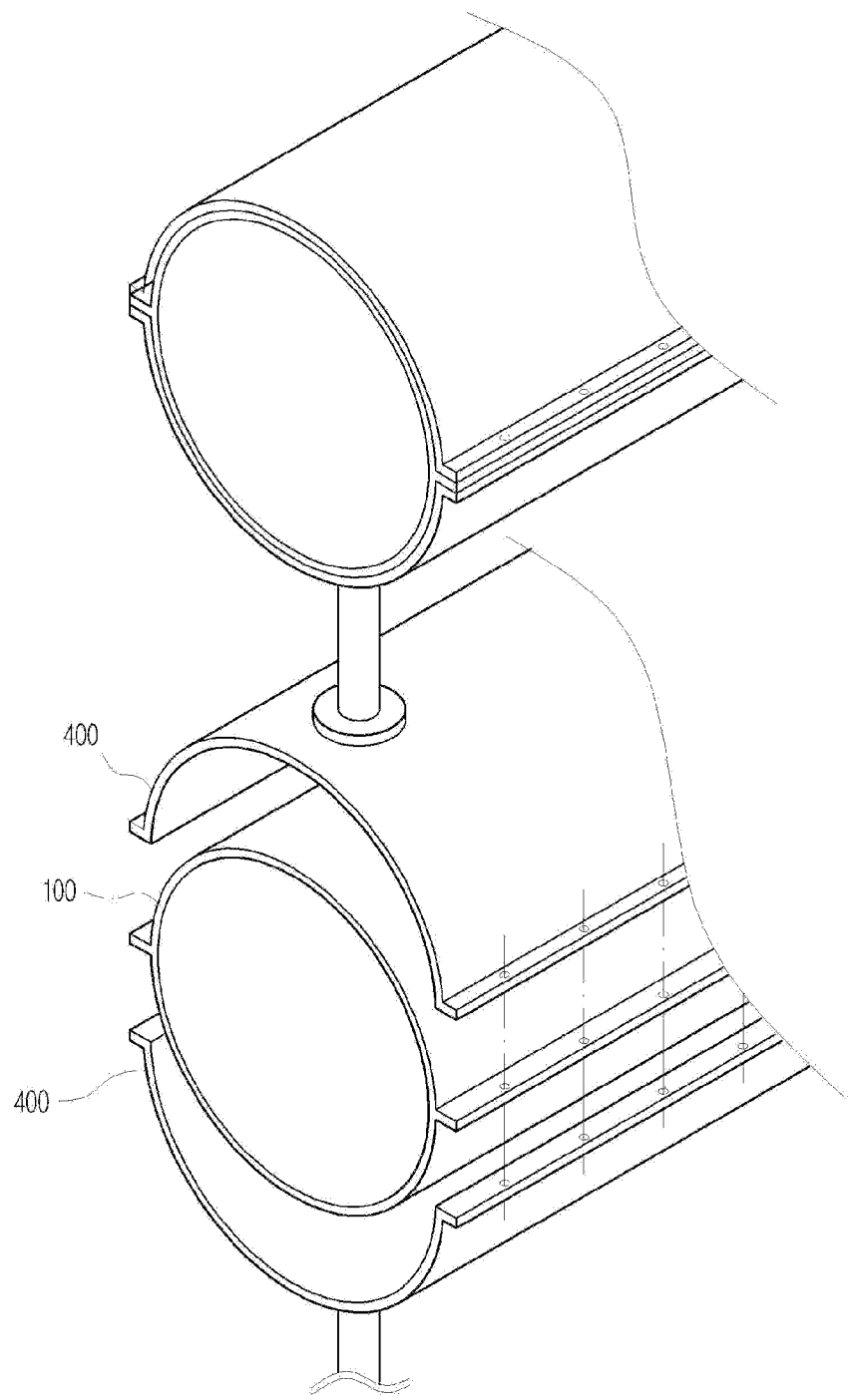
FIG. 15 illustrates a configuration of a support unit according to another embodiment of the invention.
Figure 16:
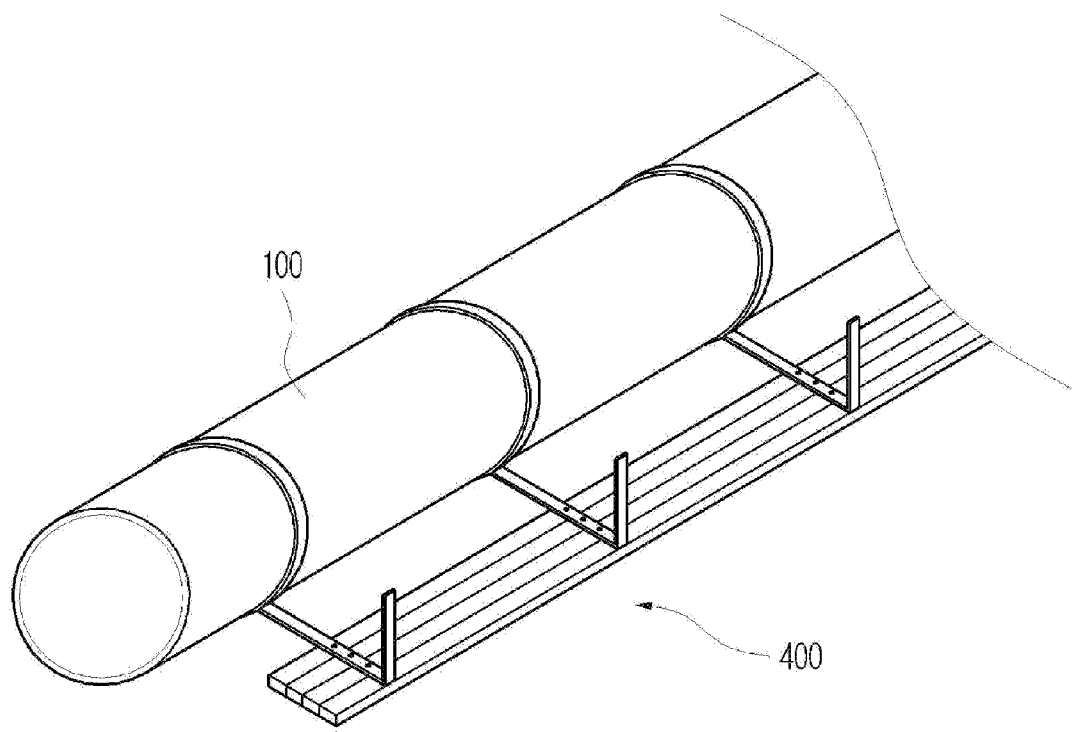
FIG. 16 illustrates a configuration of a support unit according to another embodiment of the invention.

FIGS. 14 to 16 illustrate configurations of support units according to various embodiments of the invention.

Referring to the figures, a sea cucumber cultivator according to an embodiment of the present invention is illustrated. A sea cucumber cultivator mainly includes a housing defined therein with a hollow accommodation space. An inlet pipe 110 for inflow of seawater and an outlet pipe 120 for outflow of seawater are coupled to the housing 100. A door unit 130 and an auxiliary door unit 131 are formed at side and top portions of the housing 100, respectively, to open/close the housing 100. A sea cucumber cultivator also includes a plurality of cultivation baskets 140 arranged in the form of multiple vertically-spaced layers within the housing 100 while being supported in a suspended state by the housing 100 such that the cultivation baskets 140 are horizontally uniformly spaced apart from one another in each layer. A sea cucumber cultivator also includes connection plates 160 each coupled between neighboring ones of the cultivation baskets 140 in each cultivation basket layer, to allow sea cumbers to move between neighboring cultivation baskets 140, and tilted plates 170 each coupled between a corresponding one of the cultivation baskets 140 in an upper one of neighboring ones of the cultivation basket layers and the cultivation basket 140 of the lower cultivation basket layer arranged beneath the cultivation basket 140 of the upper cultivation basket layer neighboring the corresponding cultivation basket 140, to allow sea cumbers to move between the corresponding cultivation basket 140 and the cultivation basket 140 of the lower cultivation basket layer. A sea cucumber cultivator further includes a plurality of coupled bottom plates 180 disposed at a bottom of the housing 100 so as to prevent sea cucumbers seated within the cultivation basket 140 from entering into the outlet pipe 120. The air supply unit 200 is disposed outside the housing 100 so as to supply air containing oxygen into the housing 100. The air supply unit 200 includes an air inlet pipe 150 extending from the outside of the housing 100 to the inside of the housing 100 and partially protruding into the housing 100. The water storage tank 300 is disposed outside the housing 100 so as to communicate with the inlet and outlet pipes 110 and 120 and store the seawater.

The housing 100 has a cylindrical form with a hollow space therein for receiving the cultivation baskets 140, and is supported in a horizontal manner by a support unit 400 as will be described later. Within the housing 100, rails 100a are installed to slidably support the plural cultivation baskets 140.

As shown in FIG. 3, the rails 100a have an arrangement corresponding to the arrangement of the cultivation baskets 140 where the plural cultivation baskets 140 are arranged in the form of vertically-spaced multi-layers such that the cultivation baskets 140 are horizontally spaced apart from one another in each layer, thereby increasing the accommodation density for the cultivation baskets 140.

Rollers 142 are installed at a lower surface of a top portion of each cultivation basket 140 at both sides of the cultivation basket 140 so as to enable the cultivation basket 140 to be slidably guided by the rails 100a. Stoppers (not shown) are formed at both ends of each of the rails 100a so that stopping of the cultivation basket 140 by the stoppers is released when pressure above a given level is applied thereto. Thus, when the housing 100 is tilted or an operator draws the cultivation basket 140 with slight force without intention of separation of the cultivation basket 140, the cultivation basket 140 is not easily separated from the rails 100a.

The inlet pipe 110 for inflow of seawater and the outlet pipe 120 for outflow of seawater are provided at the housing 100. The inlet and outlet pipes 110 and 120 are preferably centrally installed at the top and bottom portions of the housing 100 respectively while branching into a plurality of pipe portions. In this case, an adjustment valve for adjusting an inflow amount of the seawater is preferably installed at an end side of each of the branched pipe portions of the inlet pipe 110 communicating with the inside of the housing 100.

Here, "the end side" is a portion of each of the branched pipe portions of the inlet pipe 110 located outside the housing 100 to achieve easy operation of the adjustment valve.

Plugs having perforations are preferably fitted in respective outlet ends of the branched pipe portions of the inlet pipe 110 which are positioned within the housing 100 so as to prevent waste or containments contained in the seawater to be supplied into the housing from flowing into the housing 100.

Such plugs having perforations may also be fitted in inlet ends of the branched pipe portions of the outlet pipe 120 which are positioned within the housing 100. The seawater flowing in the inlet and outlet pipes 110 and 120 is stored in the water storage tank 300 installed outside the housing 100 to be able to store therein a certain amount of seawater and then is circulated, as desired, using a circulation pump mounted on a side of the water storage tank 130.

A temperature adjustment unit 310 is installed at the water storage tank 300 to allow the seawater to be kept at an optimal temperature for sea cucumber cultivation.

The temperature adjustment unit 310 may include a temperature sensor for sensing a temperature of the seawater in the water storage tank 300, a heater for heating the seawater when the sensed temperature of the seawater is below a predetermined temperature, and/or a chiller for cooling the seawater when the sensed temperature of the seawater is above the predetermined temperature. Details as to the temperature adjustment unit 310 are well known and thus further description thereof will be omitted.

The door unit 130 is installed at either side or both sides of the housing 100 to open/close the housing 100. In this example, as shown in FIG. 4, the door unit 130 is provided as a cover in a form of a flange and is coupled to the housing 100 using a coupling means such as a bolt and nut.

However, the coupling manner is not limited thereto. For example, one side of the door unit 130 may be coupled to a side of the housing 100 corresponding to one side of the door unit 130 using a hinge. The coupling manner of the door unit 130 to the housing 100 does not limit the present invention.

It is preferable that a door center portion 130a made of a transparent material is provided at a central region of the door unit 130 so that the inside of the housing 100 may be visible to the operator.

The auxiliary door units 131 are installed at the top portion of the housing 100 so that the inside of the housing 100 may be visible to the operator or the operator may open a door body 131a to place or take the cultivation basket 140 into/out of the housing 100. A plurality of perforations 131b is formed in the door body 131a of the auxiliary door unit 131 so as to discharge excreta or gas discharged from sea cucumbers in the housing 100 from the housing 100.

It is preferable that the formation positions of the auxiliary door units 131 vertically correspond to the positions of the cultivation baskets 140 disposed in the housing 100 in a uniformly horizontally spaced manner.

A seawater guide pipe 132 is formed along a peripheral portion of each of the auxiliary door units 131 so as to guide the seawater discharged through the perforations 131b of the auxiliary door unit 131 to an intended discharge place.

The cultivation baskets 140 are held in a suspended state in the housing 100 to provide cultivation spaces for sea cucumbers. As previously described, each cultivation basket 140 is supported by the rail 100a formed at the inner wall surface of the housing 100 to be slidable using the rollers 142 provided on the lower surface of the top portion of the cultivation basket 140 at both sides of the cultivation basket 140.

Sea cucumbers, sand and food, etc. are seated in the cultivation space of the cultivation basket 140. Sea cucumbers consume the food in the sand to grow.

The connection plates 160 are interposed between neighboring ones of the cultivation baskets 140 disposed in a horizontally spaced manner at regular intervals in each cultivation basket layer. Thus, sea cucumbers may move between neighboring cultivation baskets 140 via the connection plates 160, thereby achieving increase in the cultivation space for sea cucumbers. As shown in FIG. 6, it is preferable that each of the connection plates 160 is bent upward at outer edges thereof so as to prevent sea cucumbers from escaping from the plate when moving between the neighboring cultivation baskets 140 and falling down from the connection plate. In a similar manner to the cultivation baskets 140, the connection plates 160 may also have a plurality of perforations so that oxygen and food are upwardly supplied to upper surfaces of the connection plates 160 through the perforations.

Each tilted plate 170 is interposed between a corresponding one of the cultivation baskets 140 in an upper one of neighboring ones of the cultivation basket layers and the cultivation basket 140 of the lower cultivation basket layer arranged beneath the cultivation basket 140 of the upper cultivation basket layer neighboring the corresponding cultivation basket 140, to allow sea cumbers to move between the corresponding cultivation basket 140 and the cultivation basket 140 of the lower cultivation basket layer. The slope of the tilted plate 170 may be determined based on the vertical and horizontal distances between the cultivation baskets 140.

The connection plates 160 and tilted plate 170 allow sea cucumbers to easily move to any place within the housing 100. This effectively increases the cultivation space for sea cucumbers.

The bottom plates 180 are disposed under the lowest cultivation basket layer, that is, at the bottom of the housing 100 so as to prohibit sea cucumbers seated in the cultivation basket 140 from entering the outlet pipe 120. A locker 181 is formed at a lower surface of each bottom plate 140, to fasten the bottom plate 140 to the bottom of the housing 100. The locker 181 is formed with a central groove.

Engaging members 184 are formed on the inner bottom surface of the housing 100 so as to have a shape corresponding to that of the central groove of the locker 181. In this way, the bottom plates 180 are attached or detached to or from the housing 100 at the bottom of the housing.

The bottom plates 180 also have a plurality of perforations so that air containing oxygen flows upward from the bottom of the housing through the perforations.

As shown in FIG. 7 and FIG. 8, each bottom plate 180 includes protrusions 182 formed on one end of the bottom plate and holes 183 formed on the other end of the bottom plate at positions corresponding to the protrusions 182 while having a shape corresponding to that of the protrusions 182. Thus, a plurality of bottom plates 180 may be successively coupled in an end to end manner.

As shown in FIG. 9, different than the locker 181 and engaging member 184, guide protrusions 100b having central grooves are formed at both sides of a given position of the housing 100 respectively, and side protrusions 185 are formed at both ends of a bottom plate 180 to be engaged with the grooves of the protrusions 100b. Thus, the bottom plate 180 is supported by the guide protrusions 100b and is slidable along the grooves of the guide protrusions 100b. In this way, the bottom plate 180 and housing 100 are coupled to each other.

In a similar manner to the cultivation baskets 140, connection plates 160 and tilted plates 170, the bottom plates 180 may be covered with a dense mesh having small holes. The bottom plates 180 may be coupled to the housing 100 while being covered with the mesh.

The air supply unit 200 supplies into the housing 100 air containing oxygen which in turn is supplied to sea cucumbers. The air supply unit 200 includes the air inlet pipe 150, an air storage tank 190 and an evaporator 191. The air inlet pipe 150 includes a plurality branched pipe portions which penetrate the housing 100 and have ends protruding into the housing 100 for inflow of air into the housing 100. The air storage tank 190 supplies air to the air inlet pipe 150. The evaporator 191 is disposed between the air inlet pipe 150 and air storage tank 190 to evaporate the supplied air from the air storage tank.

The air supply unit 200 may include an oxygen supply unit for supplying oxygen into the housing 100 and an air supply unit for supplying air into the housing 100. The oxygen supply unit and air supply unit are separated from each other. Thus, both oxygen and air may be supplied into the housing 100.

mow In case air or oxygen in the air storage tank 190 is present in a liquid state, the air or oxygen may be evaporated using the evaporator 191. The evaporator 191 is necessary in that as shown in FIG. 11, the oxygen is generally available in a liquid state. When air or oxygen in the air storage tank 190 is present in a gaseous state, the evaporator 191 may be dispensed with.

An injection nozzle is provided at an end of the air inlet pipe 150 of the air supply unit 200 which communicates with the bottom of the housing 100. The injection nozzle may inject air so that settled waste, etc. on the bottom of the housing 100 moves up and is discharged into the outlet pipe 120.

Therefore, as air flow pipes with ends communicating with the bottom of the housing 100, there may exist the air inlet pipe 150 having the injection nozzle at the end thereof and the air inlet pipe 150 for supplying the oxygen. If necessary, the injection nozzle may be provided at an end of the air inlet pipe 150 for supplying the oxygen, so that supply of the oxygen and floating of the waste by a whirlpool may be performed simultaneously using a single air inlet pipe 150.

Although the air inlet pipe 150 is configured to penetrate the housing 100 and extend into the housing 100, the configuration of the air inlet pipe 150 is not limited thereto. As a variant, the air inlet pipe 150 may be configured to penetrate the auxiliary door unit 131 and extend into the housing 100.

This is because as the number of the pipes penetrating the housing 100 increases, durability and anti-leakage properties of the housing 100 decreases. That is, in order to suppress deterioration in durability and anti-leakage, the air inlet pipe 150 is configured to penetrate the auxiliary door unit 131. Further, an anti-leakage means such as a sealant may be applied around a penetration region for suppression of leakage.

The support unit 400 is provided at both ends of the housing 100 so that the housing 100 is seated thereon. As shown in FIG. 14, the support unit 400 includes an upper support part 410 and lower support part 420 which are able to be assembled together.

Recesses 430 are formed respectively at facing surfaces of the upper and lower support parts 410 and 420 of the support unit 400 while having a shape corresponding to that of an outer wall surface of the housing 100 to surround the outer wall surface of the housing 100. By stacking a plurality of support units 400, installation space of the housings may be optimized so that as many housings as possible are densely arranged.

According to another embodiment of the invention, as shown in FIG. 15, the support unit 400 may include a cylindrical upper part and a rod-shaped lower part. Such support units may be stacked to form a multi-layer arrangement. With such a configuration, the supporting space may be reduced in size compared to the above described configuration, and, hence, in case of hybrid type cultivation for both of fish and sea cucumbers, movement of fish is not interrupted.

Alternatively, as shown in FIG. 16, the support unit 400 may include band type frames surrounding and supporting the housing 100 and a support bar coupled to the frames to support the same.

Figure 17:
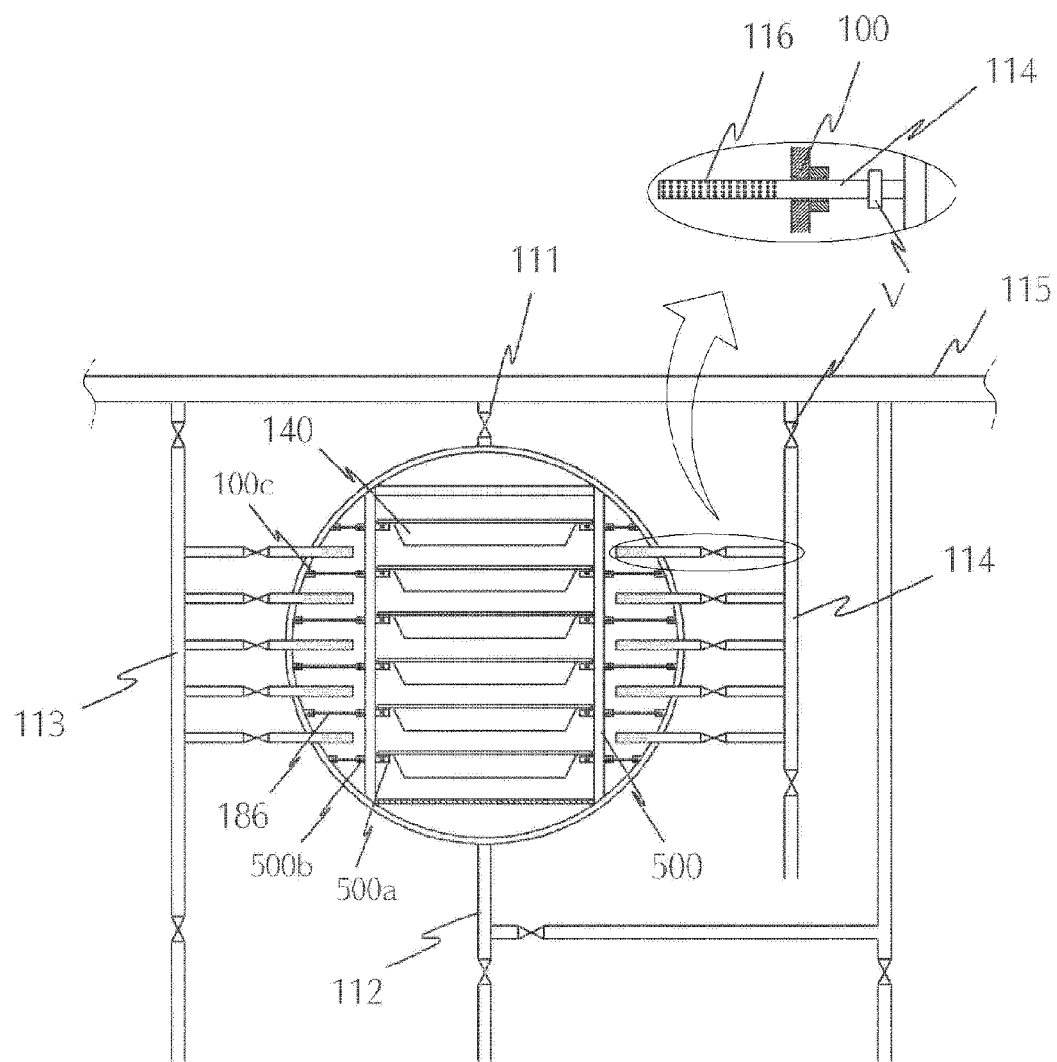
FIG. 17 illustrates a configuration of a seawater inlet and outlet pipes and an inner configuration of the housing according to another embodiment of the invention.
Figure 18:
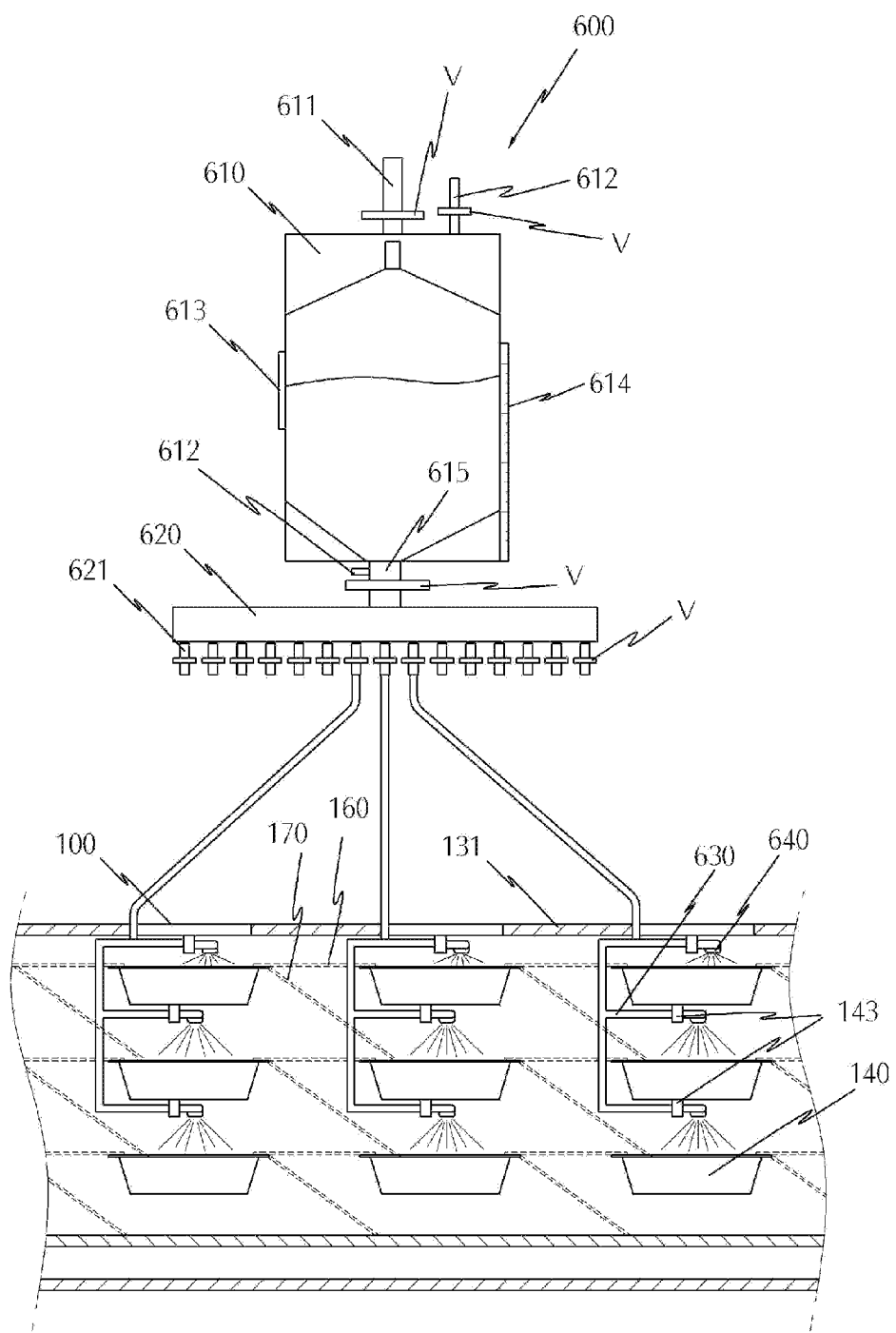
FIG. 18 illustrates a food supply unit according to an embodiment of the invention.

FIG. 17 illustrates a configuration of seawater inlet and outlet pipes and an inner configuration of the housing according to another embodiment of the invention. FIG. 18 illustrates a food supply unit according to an embodiment of the invention.

Referring to FIG. 17, the inlet and outlet pipes according to this embodiment of the invention have a different configuration from that of the inlet and outlet pipes according to the above-mentioned embodiment. To be specific, the inlet and outlet pipes according to the above-mentioned embodiment are disposed at the upper and lower sides of the housing 100 respectively, whereas the inlet and outlet pipes according to this embodiment are disposed at upper, lower, left and right sides of the housing 100. That is, the inlet and outlet pipes according to this embodiment are formed of an upper communication pipe 111, lower communication pipe 112, left communication pipe 113 and right communication pipe 114 communicating with the upper, lower, left and right sides of the housing 100 respectively for inflow or outflow of the seawater. The upper, lower, left and right communication pipes 111, 112, 113 and 114 may or may not communicate with, via opening/closing of respective values (V), a main inlet pipe 115 for transferring the seawater from the seawater storage tank 300 to the housing 100.

The respective valves are controlled such that one or more communication pipes among the upper, lower, left and right communication pipes 111, 112, 113 and 114 supply the seawater into the housing 100 using opening/closing operation of the valves while one or more other communication pipes among the upper, lower, left and right communication pipes 111, 112, 113 and 114 discharge the seawater from the housing 100 using opening/closing operation of the valves. In this way, each of the upper, lower, left and right communication pipes 111, 112, 113 and 114 may selectively function as the seawater inlet pipe or outlet pipe. Therefore, when, in case of the communication pipes having ends formed of a plurality of perforations as shown FIG. 17, the perforations are clogged with foreign substances such as sand due to continuous inflow and outflow of seawater, the clogging foreign substances may be eliminated from the perforations by controlling the valves so that the communication valves previously functioning as the inlet pipe may function as the outlet pipe and the communication valves previously functioning as the outlet pipe may function as the inlet pipe. That it, the clogging foreign substances may be eliminated by reversing the previous seawater flows.

As a result, according to this embodiment, the foreign substances clogging the communication pipes may be removed through the simple closing/opening operations of the valves without manual intervention and difficult task of removing the clogging foreign substances. Thus, the durability of the cultivator may be improved and maintenance thereof may become easy and flows of the seawater may become smooth, thereby further improving a cultivation environment.

Referring to FIG. 17, the inner configuration of the housing according to this embodiment of the invention is different from that of the housing according to the above-mentioned embodiment in that frames 500 are installed in the housing while having rails 500a for supporting the cultivation baskets 140. The frames are fixed to the housing at upper and lower inner wall faces thereof. The frames 500 include a pair of frames formed at right and left sides of the housing 100 respectively. A plurality of vertically-spaced steps extending toward the center of the housing 100 is formed at one side of each of the left and right frames 500, to form a plurality of rails 500a. Also, a plurality of vertically-spaced holders 500b is installed at the other side of each of the left and right frames 500, to support a plurality of side plates 186, which is horizontally installed between the inner wall face of the housing 100 and the corresponding frame 500 in a vertically spaced manner.

By defining the inner space of the housing using the frames 500 and by supporting the cultivation baskets 140 and side face plates 186 using the rails 500a and holders 500b formed at the frames 500, the cultivation baskets 140 may be manufactured to have a regular size not as in the previously mentioned embodiment, resulting in reduction of manufacturing cost and enabling mass production of the cultivation baskets 140.

Furthermore, by forming a plurality of the side face plates 186 having a similar form to the bottom plates 180 in left and right spaces of the housing 100 which are occupied by the cultivation baskets 140 in the previously mentioned embodiment, the cultivation space for sea cucumbers may be increased and the inner space of the housing may be more efficiently utilized.

Above the side face plates 186, the above mentioned left and right communication pipes 113 and 114 are disposed. In order to support such side face plates 186, the rails 100a as in the previously mentioned embodiment or holders 100c having a 90° rotated U-shape may be installed at the inner face of the housing 100.

If the support structures formed at the inner surface face of the housing 100 to support the side plates 186 have the form of the rails 100a, the support structures of the frames 500 to support the side plates 186 should also have the form of the rails 500a. However, in the case of FIG. 17, the support structures are formed to have the form of the holders 100c or 500b.

As shown in FIG. 18, a food supply unit 600 is installed at the outside of the housing 100 to supply food into the cultivation baskets 140 in the housing. The food supply unit 600 includes a ringer tank 610 having a given accommodation space for storing therein food for sea cucumbers and a food injection hole 611 for injecting the food and a compressed air injection hole 612 for injecting compressed air. The food supply unit 600 further includes a manifold unit 620 installed under the ringer tank 610 so as to communicate with the ringer tank 610 and having a plurality of branched pipes 621. The food supply unit 600 further includes ringer hoses 630 coupled in a communication manner to discharge ends of the branched pipes 621 and penetrating the auxiliary door units 131 of the housing 100 and held at the bottom of the cultivation baskets 140 for supplying the food in the ringer tank 610 into the cultivation baskets 140. The food supply unit 600 further includes hose outlets 640 formed at ends of the ringer hoses 630 for discharging the food.

As to the plurality of branched pipes 621, the food injection hole 611, and the compressed air injection hole 612, whether or not and/or how much food or air is injected is controlled depending on opening/closing operations of the valves (V).

A cleaning door 613 is installed at the ringer tank 610 for cleaning the inside of the tank. A food gauge 614 is installed at an outer wall of the ringer tank 610 to indicate a food amount remaining in the tank 610.

The compressed air injection hole 612 is provided to inject the compressed air as a driving source to forcibly discharge the food stored in the ringer tank 610 through the branched pipes 621 to the cultivation baskets 140. A compressed air injection hole 612 is formed at a connection pipe 615 communicating the ringer tank 610 and the branch unit 620 with each other for the purpose of generating and guiding whirlpools, to enable the food in the ringer tank 610 to be uniformly mixed.

The compressed air injection hole 612 formed at a connection pipe 615 may also be used in injecting cleaning water for cleaning the inside of the ringer thank 610. In this way, by injecting the compressed air at the same time as injecting the cleaning water, cleaning efficiency may be further improved.

The ringer hoses 630 are respectively fixed to supporting holders 142 installed beneath the cultivation baskets 140. The food is discharged through the hose outlets 640 and then naturally flows downward and accumulates in the cultivation baskets 140.

Ringer hoses 630 for the uppermost cultivation baskets 140 are held by support means such as the support holders installed at an inner surface of an upper portion of the housing 100. Thus, through such ringer hoses 630, food is supplied to the uppermost cultivation baskets 140.

According to this embodiment of the invention, not only the inflow and outflow of the seawater but also the supply of the food are easily controlled and maintained from the outside of sea cucumber cultivator. Thus, through the entire process of cultivating sea cucumbers, labor may be minimized and the working processes may be simplified.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A sea cucumber cultivator comprising:
a housing having a hollow accommodation space therein, the housing being coupled with inlet and outlet pipes for seawater inflow and outflow, and formed, at side and top portions thereof, with a door unit and an auxiliary door unit for opening/closing the housing;
a plurality of cultivation baskets supported in a suspended state in the housing, each of the baskets having a cultivation space to cultivate sea cucumbers; and
an air supply unit installed outside the housing to supply air containing oxygen into the housing, the air supply unit including an air inlet pipe penetrating the housing from an outside thereof to an inside thereof and partially protruding toward the inside of the housing,
wherein the cultivation baskets further comprise a plurality of connection plates to connect neighboring cultivation baskets among a plurality of the cultivation baskets disposed in a horizontally spaced manner at regular intervals and disposed on one rail so that sea cucumbers move between the neighboring cultivation baskets.

2. The cultivator according to claim 1, wherein the door unit is coupled to one side or both sides of the housing so as to open/close the housing; and
wherein a central portion of the door unit is made of a transparent material so that the inside of the housing is visible.

3. The cultivator according to claim 1, wherein the auxiliary door unit comprises at least one auxiliary door unit installed at the top portion of the housing;
wherein the auxiliary door unit is fixed, at one side thereof, to the housing to open/close the housing a hinge;

wherein a plurality of perforations is formed in a body of the auxiliary door unit so that air or seawater in the housing is discharged to the outside of the housing; and wherein a seawater guide pipe is formed at the outside of the body so as to guide seawater discharged through the perforations in the body.

4. The cultivator according to claim 1, wherein a plurality of perforations is formed at each of the cultivation baskets so that air flows upwardly through the cultivation basket; and wherein a plurality of rollers is installed at a lower surface of a top portion of each cultivation basket at both sides of the cultivation basket so that the cultivation basket is slidably supported by rails having a shape corresponding to the lower surface among rails formed at an inner wall surface of the housing, via the rollers.

5. The cultivator according to claim 4, wherein the rails formed at the inner wall surface of the housing or at one side of the frame comprises a plurality of vertically-spaced rails arranged along the inner wall surface to support the cultivation baskets in a stacked manner.

6. The cultivator according to claim 1, wherein a plurality of perforations is formed at each of the cultivation baskets so that air flows upwardly through the cultivation basket; and wherein a plurality of rollers is installed at a lower surface of a top portion of each cultivation basket at both sides of the cultivation basket so that the cultivation basket is slidably supported by rails having a shape corresponding to the lower surface among rails formed at one side of a frame installed in the housing, via the rollers.

7. The cultivator according to claim 6, wherein the frame is fixed to the housing at upper and lower portions of the inner wall face of the housing, and the frame comprises a pair of frames installed at right and left sides of the housing respectively;

wherein a plurality of vertically-spaced steps extending toward a center of the housing is formed at one side of each of the left and right frames, to form the plurality of rails, and a plurality of vertically-spaced holders is installed at the other side of each of the left and right frames, to support a plurality of side plates, each of which is horizontally installed between the inner wall face of the housing and the frame corresponding to the holders.

8. The cultivator according to claim 1, further comprising a water storage tank disposed outside the housing so as to communicate with the inlet and outlet pipes and store the seawater, wherein a temperature adjustment unit is installed at the water storage tank for adjusting a seawater temperature.

9. The cultivator according to claim 8, wherein the inlet and outlet pipes include an upper communication pipe, lower communication pipe, left communication pipe and right communication pipe communicating with the upper, lower, left and right sides of the housing respectively for inflow or outflow of the seawater, wherein the upper, lower, left and right communication pipes communicate or do not communicate with, via opening/closing of respective valves, a main inlet pipe for transferring the seawater from the water storage tank to the housing, wherein the respective valves are controlled such that one or more communication pipes among the upper, lower, left and right communication pipes injects seawater into the housing via opening/closing operation of the valves while one or more other communication pipes among the upper, lower, left and right communication pipes discharges seawater from the housing via opening/closing operation of the valves.

10. The cultivator according to claim 1, further comprising a food supply unit installed at the outside of the housing to supply food into the cultivation baskets within the housing, the food supply unit comprising:

a ringer tank having a given accommodation space for storing therein food for sea cucumbers, a food injection hole for injecting food and a compressed air injection hole for injecting compressed air;

a multifold unit being installed under the ringer tank so as to communicate with the ringer tank and having a plurality of branched pipes;

ringer hoses being coupled in a communication manner to discharge ends of the branched pipes and penetrating the auxiliary door unit of the housing and being held at the bottom of the cultivation baskets for supplying the food in the ringer tank into the cultivation baskets; and hose outlets formed at ends of the ringer hoses for discharging the food, wherein as for the plurality of branched pipes, the food injection hole, and the compressed air injection hole, whether or not and/or how much food or air is injected is controlled depending on closing/opening operations of valves.

11. The cultivator according to claim 1, further comprising a support unit provided at both ends of the housing so that the housing is seated thereon.

12. The cultivator according to claim 11, wherein the support unit includes an upper support part and lower support part which are assembled together, wherein recesses are formed respectively at facing surfaces of the upper and lower support parts of the support while having a shape corresponding to that of an outer wall of the housing to surround the outer wall of the housing.

13. The cultivator according to claim 12, wherein a plurality of the support units is stacked so that a plurality of the housings is densely arranged.

14. The cultivator according to claim 1, wherein the air supply unit comprises:

an air inlet pipe having a plurality of branched pipe portions which penetrate the housing and have ends protruding into the housing for inflow of air into the housing;

an air storage tank for injecting air into the air inlet pipe; and an evaporator disposed between the air inlet pipe and air storage tank to evaporate the injected air from the air storage tank.

15. The cultivator according to claim 14, wherein the air supply unit further comprises an oxygen supply unit for supplying oxygen into the housing.

16. A sea cucumber cultivator comprising:

a housing having a hollow accommodation space therein, the housing being coupled with inlet and outlet pipes for seawater inflow and outflow, and formed, at side and top portions thereof, with a door unit and an auxiliary door unit for opening/closing the housing;

a plurality of cultivation baskets supported in a suspended state in the housing, each of the baskets having a cultivation space to cultivate sea cucumbers; and an air supply unit installed outside the housing to supply air containing oxygen into the housing, the air supply unit including an air inlet pipe penetrating the housing from an outside thereof to an inside thereof and partially protruding toward the inside of the housing, wherein the baskets further comprise tilted plates connecting one cultivation basket among a plurality of the cultivation baskets disposed in a vertically spaced manner at regular intervals and another cultivation basket immediately under a cultivation basket horizontally neighboring the former cultivation basket so that sea cucumbers move between the former and latter cultivation baskets.

17. A sea cucumber cultivator comprising:

a housing having a hollow accommodation space therein, the housing being coupled with inlet and outlet pipes for seawater inflow and outflow, and formed, at side and top portions thereof, with a door unit and an auxiliary door unit for opening/closing the housing;

a plurality of cultivation baskets supported in a suspended state in the housing, each of the baskets having a cultivation space to cultivate sea cucumbers; and an air supply unit installed outside the housing to supply air containing oxygen into the housing, the air supply unit including an air inlet pipe penetrating the housing from an outside thereof to an inside thereof and partially protruding toward the inside of the housing, wherein a plurality of bottom plates coupled to each other are disposed at a bottom of the housing so as to prevent sea cucumbers seated within the cultivation basket from entering the outlet pipe, wherein each locker is formed at a lower face of each of the bottom plates while having a central groove for fastening the bottom plate to the bottom of the housing, wherein each engaging member is formed on an inner face of a bottom of the housing while having a shape corresponding to that of the central groove of the locker, wherein the locker is attached to or detached from the engaging member.

* * * * *